(12) United States Patent
Harrier et al.

(10) Patent No.: US 9,763,031 B1
(45) Date of Patent: Sep. 12, 2017

(54) SYSTEM AND METHOD FOR TRANSFERRING INFORMATION AMONG PARTIES

(71) Applicant: Harrier, Inc., Sun City West, AZ (US)

(72) Inventors: Laymond D. Harrier, Sun City West, AZ (US); Jonathan A. Harrier, Phoenix, AZ (US); Matthew L. Harrier, Glendale, AZ (US); Edward P. Andert, III, Tempe, AZ (US)

( * ) Notice: Subject to any disclaimer, the term of this patent is extended or adjusted under 35 U.S.C. 154(b) by 0 days.

(21) Appl. No.: 15/068,414

(22) Filed: Mar. 11, 2016

(51) Int. Cl.
*H04B 5/00* (2006.01)
*H04W 4/00* (2009.01)
*H04W 76/02* (2009.01)

(52) U.S. Cl.
CPC .......... *H04W 4/008* (2013.01); *H04B 5/0031* (2013.01); *H04W 76/021* (2013.01)

(58) Field of Classification Search
CPC ................................. H04B 5/02; H04B 5/0012
USPC .................................................. 455/41.1, 41.2
See application file for complete search history.

(56) References Cited

U.S. PATENT DOCUMENTS

| | | | | |
|---|---|---|---|---|
| 9,122,334 | B1 * | 9/2015 | Olsen | G06F 3/03545 |
| 2005/0176370 | A1 * | 8/2005 | McSheffrey | H04W 88/02 |
| | | | | 455/41.2 |
| 2007/0136154 | A1 * | 6/2007 | Chung | G06Q 10/08 |
| | | | | 705/29 |
| 2011/0258159 | A1 * | 10/2011 | Mitchell | H04M 1/274516 |
| | | | | 707/613 |
| 2012/0322411 | A1 * | 12/2012 | Lazarev | H04W 12/06 |
| | | | | 455/411 |
| 2014/0006547 | A1 * | 1/2014 | Mullin | G06Q 30/02 |
| | | | | 709/217 |

* cited by examiner

*Primary Examiner* — Raj Chakraborty
(74) *Attorney, Agent, or Firm* — Thomas W. Galvani, P.C.; Thomas W. Galvani

(57) ABSTRACT

A system and method for transferring information among parties, such as an exhibitor and an attendee for an event, includes providing a near-field communication device to the exhibitor and a near-field communication device to the attendee. A computer server includes a processor, non-transitory memory, and a database. The near-field communication devices are coupled to the computer server in wireless communication. The exhibitor creates an exhibitor account on the database and loads it with information about the exhibitor. Similarly, the attendee creates an attendee account on the database and loads it with information about the attendee. A connection is established between the exhibitor and the attendee. The connection provides the exhibitor with access privileges to information in the attendee account and provides the attendee with access privileges to information in the exhibitor account.

18 Claims, 6 Drawing Sheets

| Info Packet | ID String | Attendee ID | Exhibitor ID | Rating | Note | Booth Rating | Booth Note | Other |
|---|---|---|---|---|---|---|---|---|
| 70 | 71 | 72 | 73 | 74 | 75 | 76 | 77 | 78 |

FIG. 6

SYSTEM AND METHOD FOR TRANSFERRING INFORMATION AMONG PARTIES

FIELD OF THE INVENTION

The present invention relates generally to communication systems, and more particularly to software-based communication systems.

BACKGROUND OF THE INVENTION

Conferences are gathering events for people and business sharing a common interest. Trade show conferences seek to bring together retailers, distributors, manufacturers, and consumers in one place to promote the rapid, efficient, and economic exchange of information. Most conferences share similar characteristics: they occupy a large amount of real estate, vendors or exhibitors set up booths to display and advertise their goods and services, and people roam through the real estate visiting booths of interest.

At each booth, the exhibitor will interact with the attendee. The exhibitor and attendee will typically discuss the exhibitor's goods or services, the exhibitor will answer questions from the attendee, and the exhibitor will gauge the attendee's relative interest in the goods, services, or the exhibitor itself. In some situations, the attendee will be a general member of the public, such as an ordinary consumer, while in other situations, the attendee will be another business. In the latter situation, the business-to-business exchange may be formal and may be for the purpose of seeking a supplier, a salesman, a distributor, etc.

Other than the oral information communicated during such an interaction, less transitory information is exchanged as well. The exhibitor often gives the attendee contact information, such as a website address, social media account, or a business card carrying direct personal contact information. The attendee may also provide contact information to the exhibitor.

The interaction ends, and both parties usually judge their interest in the other party. The exhibitor may judge whether the attendee is a likely customer, and may even make a note to call the attendee at a future date. The attendee may judge whether he or she liked the exhibitor, whether he or she plans to call the exhibitor in the future, or whether the exhibitor is someone the attendee wishes to do business with. The exhibitor and attendee, however, are not aware of how the other judges them beyond what was apparent during the interaction.

Before the interaction ends, the exhibitor frequently also provides literature to the attendee. Literature is usually paper literature, such as flyers, brochures, pamphlets, catalogs—whatever the exhibitor thinks is appropriate for the conference, their goods and services, or the particular attendee. Literature provides supposedly helpful information to the attendee in a permanent form. While the exchange of such literature does provide the attendee with something tangible to hold, read, and review, there are a number of problems with this established method of conference communication.

First, the attendee will accumulate a large amount of literature. While the attendee could be attending the conference for the exclusive reason of visiting with one vendor, this is unlikely. Generally, attendees visit many, many exhibitor booths, each of which provides literature to the attendee. As a result, most attendees will carry a bag to hold their accumulated literature. The bag can quickly become heavy, cumbersome, and annoying.

Second, the literature is generally non-specific. While exhibitors have some idea who the attendees will be when they print the literature, they must to some extent make their literature generic to a range of attendees. Therefore, many attendees end up taking more literature than they need, because information relevant to them is bound up with irrelevant information. The exhibitor simply cannot practically filter relevant information from irrelevant information to provide to the attendee.

Third, and related to the first two problems, most of the literature is usually thrown away. Unfortunately, because the attendee ends up carrying around a large amount of mostly irrelevant information, the attendee usually will throw most of it away, rather than schlep it back home or onto an airplane.

Fourth, the literature is extremely expensive. It is quite expensive to print, ship, and set up at a conference. It is so expensive, in fact, that some exhibitors are known to search conference trash cans for discarded literature that they can re-use, rather than re-order or print more literature. The costs for having literature available at a conference can easily reach several thousand dollars for a mid-sized company.

Fifth, there is no possibility for obtaining literature before or after the conference begins. All parties must wait until they are at the conference to obtain literature. An attendee who is interested in a certain exhibitor or product of the exhibitor has no way to obtain conference literature beforehand, which might otherwise allow him to have a more productive conference experience. Similarly, an attendee cannot obtain literature after the conference, unless he writes to the exhibitor and specifically requests material, or requests some type of material that may or may not exist.

Sixth, there is very little objective means for an exhibitor to evaluate the conversion rates or effectiveness of a conference or a particular company representative.

For these reasons and others, a new way to facilitate connections, communications, and the exchange of information is needed.

SUMMARY OF THE INVENTION

A system and method for transferring information among parties, such as between an exhibitor and an attendee for an event, is described herein. It includes providing a near-field communication device to the exhibitor and a near-field communication device to the attendee. The exhibitor and attendee connect to the computer server, which includes a processor, non-transitory memory, and a database. The exhibitor creates an exhibitor account on the database and loads it with information about the exhibitor. Similarly, the attendee creates an attendee account on the database and loads it with information about the attendee. The attendee establishes a connection with the exhibitor before, during, or after the event. Before or after the event, the connection is established through a personal device of the attendee. At the event, the near-field communication devices are coupled to the computer server in wireless communication and are used to establish the connection between the exhibitor and the attendee. The connection provides the exhibitor with access privileges to some of the information in the attendee account and also provides the attendee with access privileges to most of the information in the exhibitor account.

BRIEF DESCRIPTION OF THE DRAWINGS

Referring to the drawings:

FIG. 6 is a generalized diagram of an information packet of the system of FIG. 1.

DETAILED DESCRIPTION

Figure 1:
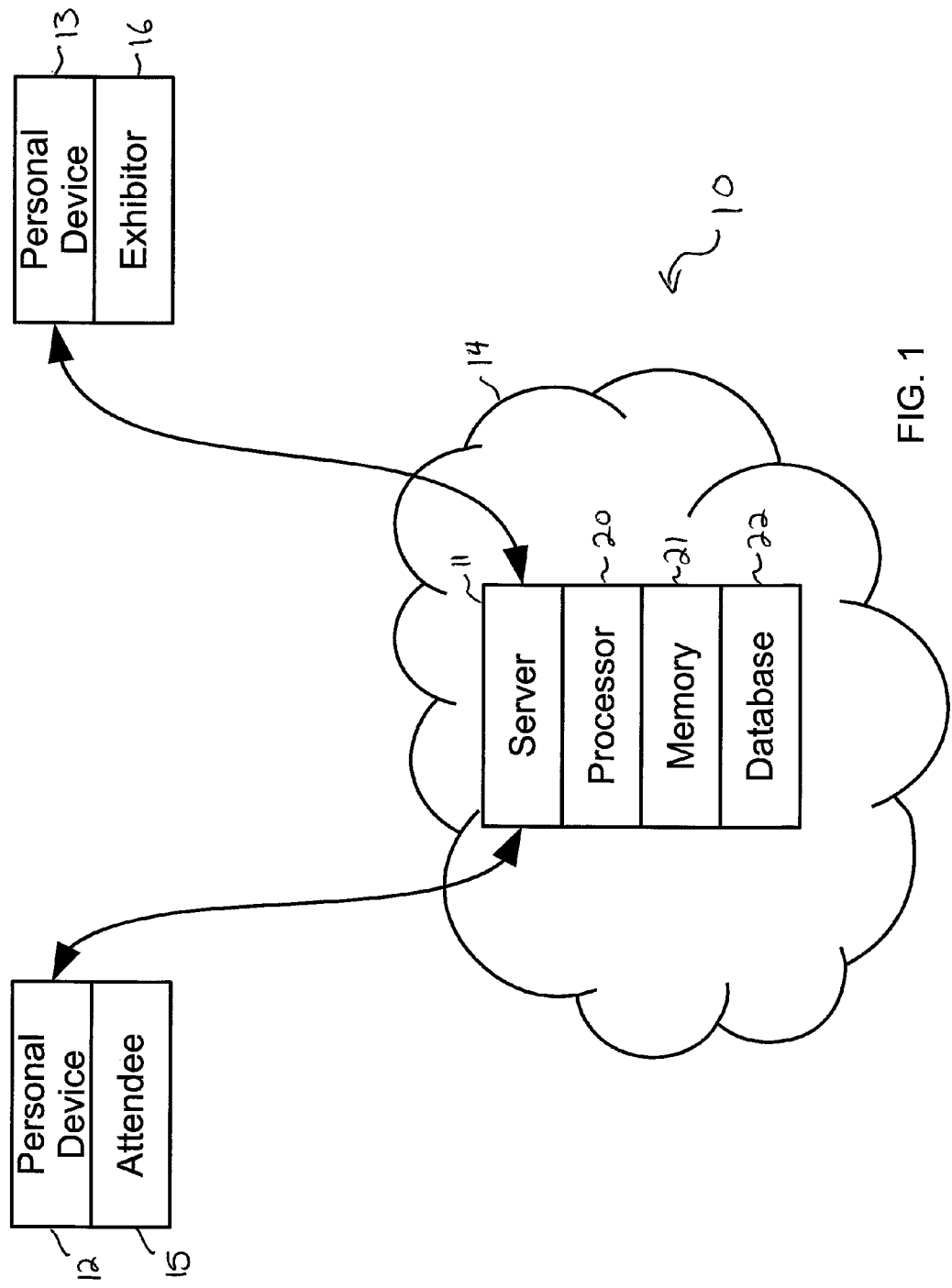
FIG. 1 is a generalized diagram of a system of transferring information among an attendee, an exhibitor, and a server.

Reference now is made to the drawings, in which the same reference characters are used throughout the different figures to designate the same elements. FIGS. 1-4 illustrate a system 10 for transferring information among multiple parties. The system 10 includes a server 11 and multiple personal communication devices, such as an attendee personal device 12, an exhibitor personal device 13, an attendee conference device 55, and an exhibitor conference device 56. The attendee and exhibitor personal devices 12 and 13, and the attendee and exhibitor conference devices 55 and 56, are exemplary personal communication devices, and one having ordinary skill in the art will readily appreciate that the system accommodates and operates a large range in the number of personal communication devices, from several to several thousand. The description herein will refer to these four devices—the attendee personal device 12, the exhibitor personal device 13, the attendee conference device 55, and the exhibitor conference device 56—for exemplary purposes only, and will refer to the system 10 within the context of an industry trade show conference.

Further, although the discussion throughout this description will refer to the system 10 as one for connecting and communicating information among a server 11, attendee and exhibitor personal devices 12 and 13, and attendee and exhibitor conference devices 55 and 56 in the context of a trade show conference, one having ordinary skill in the art should readily appreciate that the present invention is a multiple-party connection and communication system, which can also be used in other non-conference settings.

The server 11 is preferably not located on site at the conference, but rather, is located offsite and accessible through the Internet 14, and as such, is considered a cloud-based server. In other cases, however, the server 11 is located at the conference and is still accessible through the Internet or a local area network. Attendees 15 and exhibitors 16 access the server 11 through their attendee and exhibitor personal devices 12 and 13, respectively, through a wireless connection to the server 11 through the Internet 14.

Figure 5:
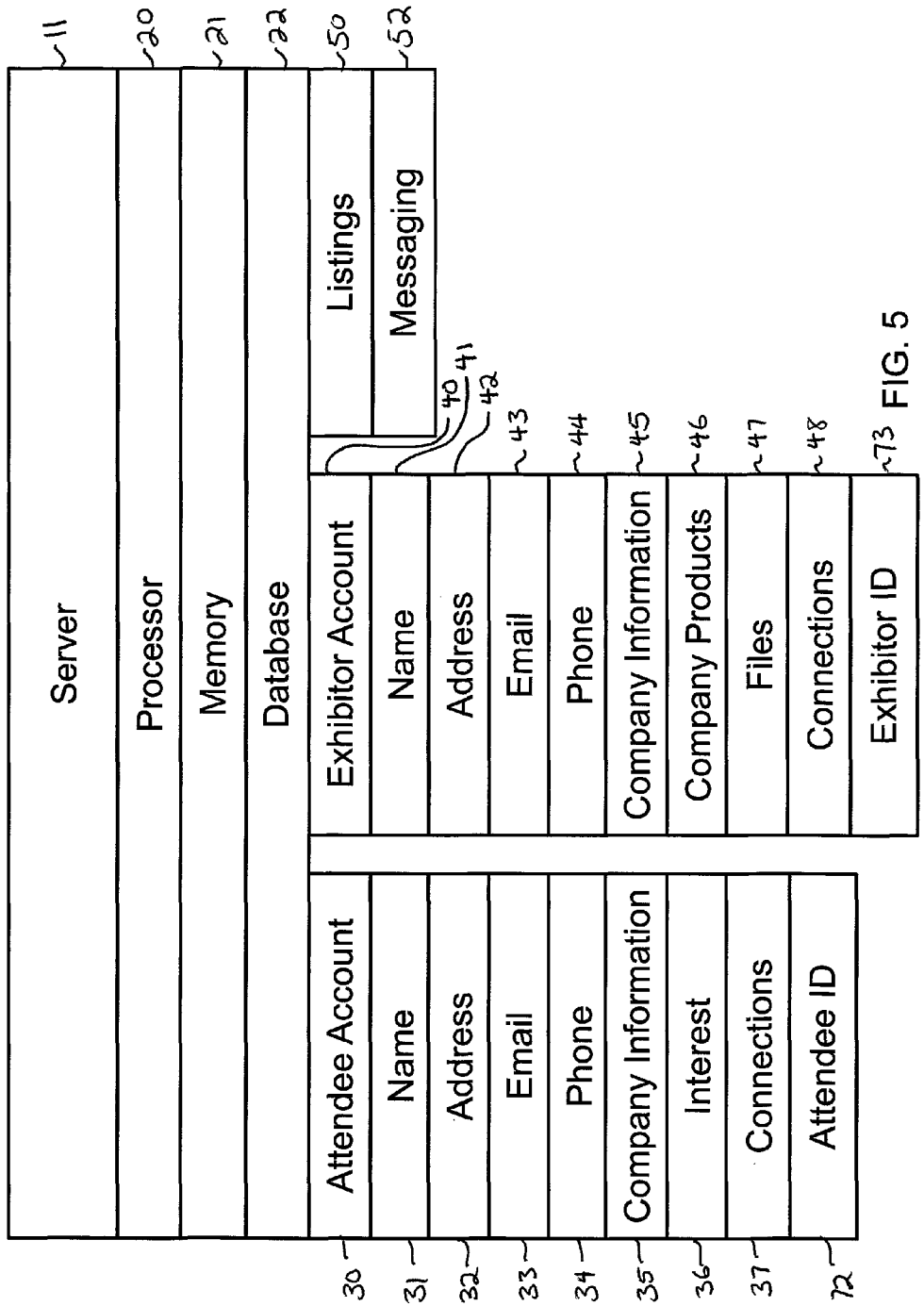
FIG. 5 is a generalized diagram of the server of FIG. 1.

The server 11, shown in more detail in FIG. 5, includes a processor 20, non-transitory memory 21, and a database 22. The attendee and exhibitor devices 12 and 13 are capable of reading and writing to the database 22 on the server 11. The server 11 is specially programmed with specialized software to send and receive instructions and information from the attendee and exhibitor devices 12, 13, 55, and 56 as will be described.

The server 11 is initially built and connected to the Internet 14. A conference organizer—either a person or entity hosting a conference—then contracts with the owner of the server 11 to use the server 11 for enabling connections and communications between attendees 15 and exhibitors 16 of the conference. A person becomes an attendee 15 when he registers for the conference, such as by signing up online. Briefly, for purposes of ease and clarity, the attendee 15 will be referred to as a male person, though one having ordinary skill will understand that an attendee 15 may be a man, a woman, or a business entity with personal representatives at the conference. For the same reasons of ease and clarity, the exhibitor 16 will be referred to herein as a female person, though again one having ordinary skill will understand that an attendee 15 may be a man, a woman, or a business entity with personal representatives at the conference.

When the attendee 15 registers, he provides personal information to the conference. He typically does this at a home or work computer connected to the Internet 14, and so the attendee personal device 12 is likely this home or work computer. At this same time, he establishes an attendee account 30 with the server 11. The attendee account 30 is instantiated in the database 22 of the server 11 and the attendee 15 loads it with information. Each attendee 15 has a unique attendee account 30, and there are thus many attendee accounts 30 stored in the database 22. The attendee 15 provides his name 31, which is stored in the attendee account, along with his physical address 32, email address 33, and phone number(s) 34. The attendee 15 further provides company information 35, such as a website address for his company and his job title. The attendee 15 also has the ability to provide product interest 36 information, which can include basic biographical information about the attendee 15 or the company he represents, as well as information they are looking for from exhibitors 16. This information, upon entering by the attendee 15, is saved and stored in the non-transitory memory 21 of the server 11 for later querying or reproduction. This information can be changed at a later time by accessing a settings function in the attendee account 30. The attendee account 30 further includes a list of connections 37 to exhibitors 16, which at registration is empty.

The exhibitor 16, likewise, has an account which she loads with information. When the exhibitor 16 registers, she provides personal information to the conference (again, the exhibitor 16 is described herein as a person, though can be a person or an entity). The exhibitor 16 does this with a computer connected to the Internet 14, and thus connected to the server 11, and so the exhibitor personal device 13 is generally this computer. At this time, she establishes an exhibitor account 40 with the server 11. The exhibitor account 40 is instantiated in the database 22 of the server 11. Each exhibitor 16 has a unique exhibitor account 40, and there are thus many exhibitor accounts 40 stored in the database 22. The exhibitor 16 provides her name 41, which is then stored under the exhibitor account 40, along with a physical address 42, email address 43, and phone number(s) 44. The exhibitor 16 further provides company information 45, such as address, website address, email address, and phone number information for the company the exhibitor 16 represents. The company information 45 also includes a text description about the company, its mission, its people, and the like. The exhibitor 16 then enters information about her company products 46, which attendees 15 can use to quickly survey and learn about their offerings. Finally, the exhibitor 16 submits files 47 to the exhibitor account 40. The files 47 that the exhibitor can submit are varied and include documents of any formats (.doc, .ppt, .pdf), media content such as audio and video files, hyperlinks to external websites such as the exhibitor's company's website or some other site, hyperlinks to social media accounts, biographical information, and folders or directories containing additional files. Uploading files 47 allows an exhibitor 16 to easily and cheaply store and make accessible a variety of literature. All of this information, upon entering by the exhibitor 16, is saved and stored in the non-transitory memory 21 of the server 11 for later querying or reproduction. This information can be changed at a later time by accessing a settings function in the exhibitor account 40. The exhibitor account 40 further includes a list of connections 37 to attendees 15, which at registration time is empty.

Once the attendee and exhibitor accounts 30 and 31 have been instantiated, the attendee 15 and the exhibitor 16 are connected to the server 11 through the Internet 14 by their attendee and exhibitor personal devices 12 and 13, respectively, as illustrated in FIG. 1. As stated above, the attendee and exhibitor personal devices 12 and 13 are typically home or work computers; they may also be tablet devices, smart phones, or similar computer devices having display, a processor, non-transitory memory, and access to the Internet 14. The attendee and exhibitor personal devices 12 and 13 are not, however, provided by the conference organizer. This allows the attendee 15 and the exhibitor 16 to pre-register and connect in a certain way. Pre-registration is the sequence of steps just described above in which the attendee 15 and exhibitor 16 provide biographical and product information before the conference.

A connection is a status characterizing a relationship between the attendee 15 and the exhibitor 16. A connection between the two provides the exhibitor 16 with access privileges to some of the information in the attendee account 30 and provides the attendee 15 with most of the information in the exhibitor account 40. Without a connection being made, the attendee 15 has limited ability to interact with the exhibitor 16, and the exhibitor 16 has no ability to interact with the attendee 15 or view information about the attendee 15.

Connections are established in one of two ways: manually or automatically. Before the conference, a connection may only be established manually. Manual connections may, however, be established at any time—before, during, or after the conference. The ability to create a manual connection is provided by the system 10 from the moment the attendee 15 creates his attendee account 40. Only the attendee 15 can establish a manual connection.

To establish a manual connection, the attendee 15 uses his attendee personal device 12 to connect to the server 11, logging in to his attendee account 30. The attendee 15, wishing to preview the exhibitors 16, navigates to a listings 50 function on the server 11. The listings 50 lists all exhibitors 16 who have registered for the conference, and information for those exhibitors 16 who have created exhibitor accounts 40 is accessible by the attendee 15 through the listings 50. The listings 50 can be sorted by booth number, connection time, exhibitor 16 name 41, or rating, and is searchable.

The first time the attendee establishes a connection and visits the listings 50, all the exhibitors 16 listed are "unconnected," meaning that there is no connection between the attendee 15 and those exhibitors 16. This is preferably indicated by a symbol, and a preferred embodiment of the system 10 uses a "2U" symbol proximate to the name of the exhibitor 16 to identify exhibitors 16 in the listings 50 who are not connected to the attendee 15. The attendee 15 browses the listings 50. The attendee 15 can access the name 41, address 42, email 43, and phone 44 of the exhibitor 16, but most importantly, the attendee 15 can view the company information 45, company products 46, and files 47 of the exhibitor 16. The listings 50 displays the company information 45 and the company products 46 directly, under an option that expands or contracts the listing for the exhibitor 16 to display or hide this additional information, respectively. The listings 50 also provides a link to the files 47 of the exhibitor 16, so that the attendee 15 can browse through all of the literature the exhibitor 16 has previously uploaded into her files 47. This allows the attendee 15 to quickly determine what the exhibitor 16 has to offer with respect to products and services, and what the exhibitor 16 may be featuring or focusing on during this conference. The files 47 screen identifies the name, file type, and last modified date of each files; the name of the file is an active link that opens the file itself.

Figure 2:
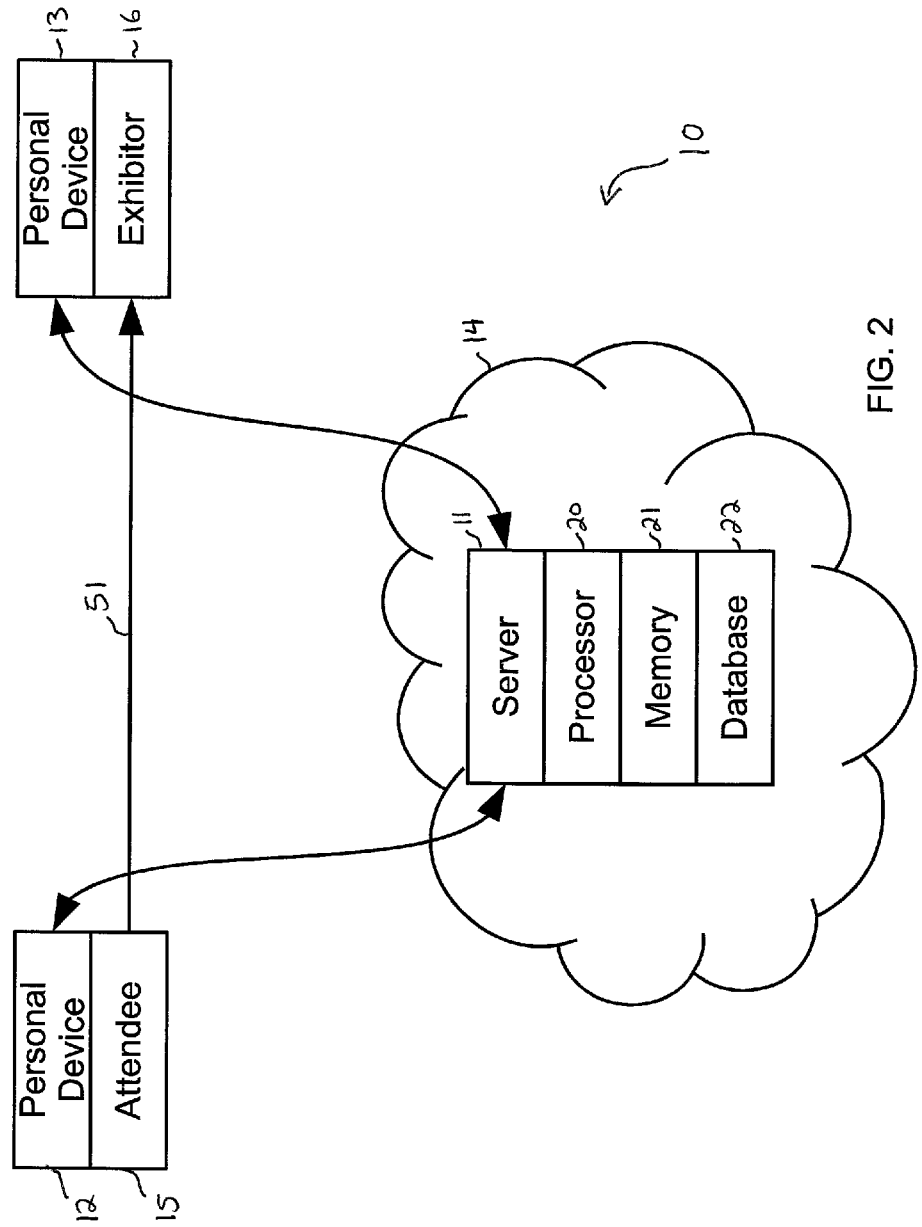
FIG. 2 is a generalized diagram of the system of FIG. 1 and illustrating a manual connection established between the attendee and the exhibitor.

Based on this information, the attendee 15 identifies an exhibitor 16 with whom he wishes to be connected. He then selects or clicks on the 2U symbol, thereby issuing a request through the server 11 to connect the attendee 15 and the exhibitor 16. In response to the request, the server 11 establishes a connection 51 between the attendee 15 and the exhibitor 16 by listing each in the other's connections 37 and 48, as illustrated in FIG. 2.

When a connection 51 is created manually, a popup screen appears in front of the attendee 15 on his attendee personal device 12. The popup screen allows the attendee 15 to rate the level of interest in the exhibitor 16 with a rating, allows the attendee 15 to write a note for the exhibitor 16, and allows the attendee 15 to write a note for himself. After the connection 51 is established with the exhibitor 16, the listings 50 for the attendee 15 show the exhibitor 16 as connected (such as by not showing the 2U symbol), show the date and time at which the connection 51 was established, and show the rating the attendee 15 has assigned to the exhibitor 16. Moreover, an indication is displayed as to whether new information has been supplied by the exhibitor 16.

The attendee 15 can thus establish connections with as many exhibitors 16 as he desires by performing the above steps with all of the exhibitors 16 in which he has an interest. The attendee 15 can later delete a connection 51 or modify the connection 51 by removing or changing the star rating or notes regarding the exhibitor 16. Further, a list or spreadsheet of all connected exhibitors 16 can be created with an export functionality of the software.

Once a connection 51 is made, the attendee 15 and exhibitor 16 can communicate with each other through the messaging 52 function. Messages are sent independently of a conventional email protocol, and are stored in respective private portions of the attendee and exhibitor accounts 30 and 40. Further, the status of messages is visible at all times to both the attendee 15 and exhibitor 16, regardless of who was the sending or receiving party.

Both the attendee 15 and exhibitor 16 can send a message, so long as they have a connection 51. Messages are organized by new, sent, read, and deleted messages. New messages are those which have been sent to the attendee 15 but not yet read. A new message, once read, can be replied to, deleted, or left alone. A message left alone—not responded to or deleted—automatically becomes organized as a read message. If the attendee 15 chooses to reply to the message, the original message and the new message are combined into a single message and organized as a sent message. Sent messages are those which the attendee 15 has sent to a specific exhibitor 16. If the attendee 15 chooses to delete the message, it is organized as a deleted message. The attendee 15 can identify both the company and the representative of the exhibitor 16 who sent a message. In other words, every message sent from an exhibitor 16 identifies both the company name and the representative who actually sent the message. Because multiple representatives may respond within a chain of messages, each message shows the respective representative who wrote the message. Once a message is sent, both the attendee 15 and the exhibitor 16 can see its status: each can see whether the message has been read or deleted, as well as the date on which the reading or deleting occurred.

Manually establishing connections allows an attendee 15 to connect to an exhibitor 16 at any time—before, during, or after a conference. This offers a convenient way for attendees 15 to learn more and engage with exhibitors 16 at their leisure. Connections can also be established automatically, however.

Essentially all conferences have a physical check-in process when an attendee 15 or exhibitor 16 initially arrives at the conference. Typically, the attendee 15 is given a badge with basic identifying information such as his name, company, city and state, etc. The attendee 15 may also be given basic information about the conference such as a schedule or a map of the conference layout. The exhibitor 16 is also given a badge with similar basic identifying information.

Figure 3:
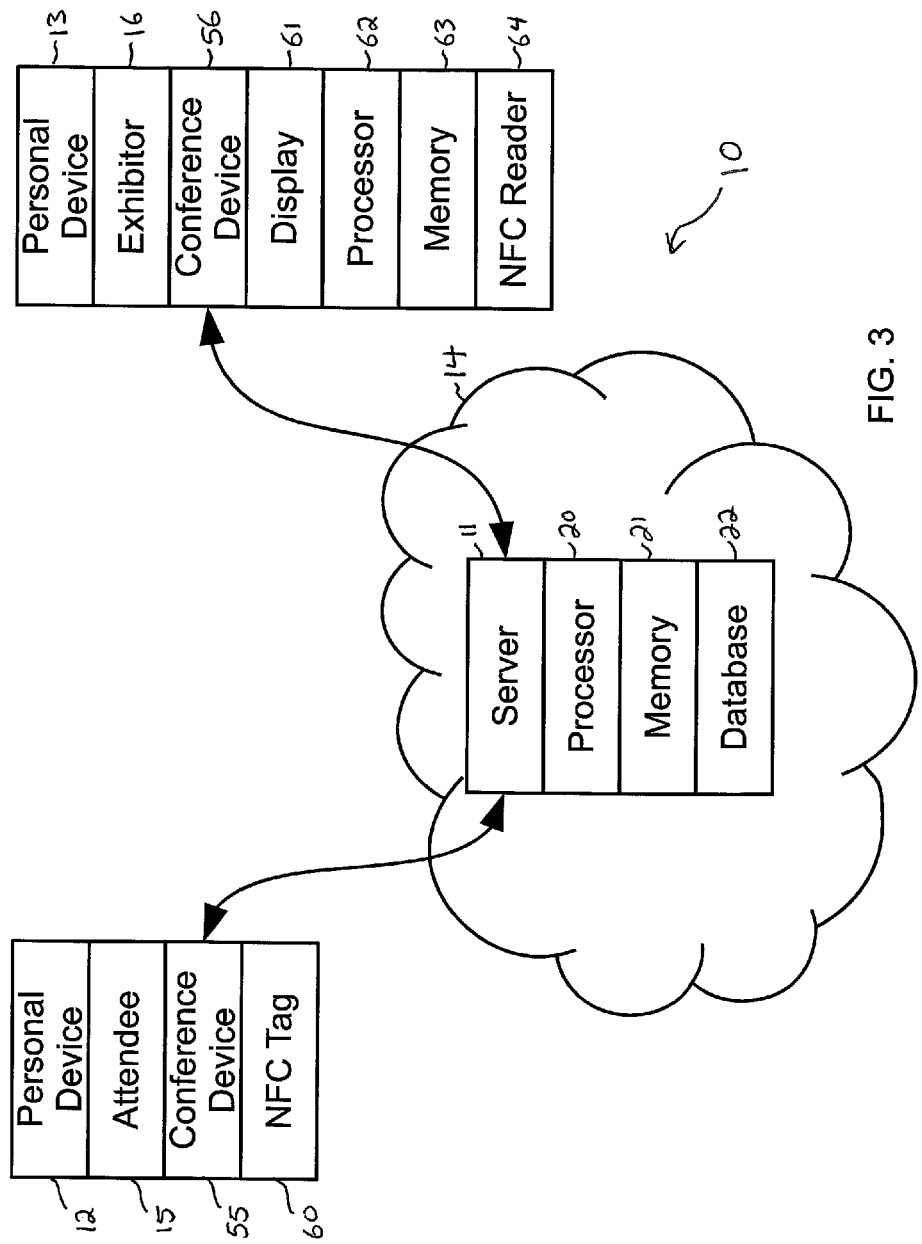
FIG. 3 is a generalized diagram of the system of FIG. 1 during an event which the attendee and exhibitor are both attending.

At a conference using the system 10, the attendee 15 and exhibitor 16 receive specialized hardware, or conference devices 55 and 56, respectively, as shown in FIG. 3. At check in, the attendee 15 receives his attendee conference device 55, which is preferably a badge embedded with a short-range wireless transmission device, which is preferably a near-field communication ("NFC") tag 60, but may also be an RFID tag, Bluetooth device, Wi-Fi device, or like wireless transmission device. An NFC tag 60 will be discussed for purposes of this description. The NFC tag 60 is a passive device including loops of wire connected to a small microchip with on-board solid-state, non-transitory memory and which relies on electromagnetic induction when in near-field proximity—or very close range—to an NFC-enabled device, such as a smart phone or tablet, to transmit information or a lookup address for information. NFC tags are very small, very light, and very thin. The NFC tag 60 is easily carried on the badge of the attendee 15 without being obtrusive or heavy.

The attendee conference device 55 is pre-encoded based on the information provided by the attendee 15 during registration. The attendee conference device 55 preferably does not include the actual information provided by the attendee 15 during registration, but instead includes an encoded string or key which points the lookup device to such information. The lookup string is a unique attendee identifier. It includes an unalterable tag number, a conference identifier, and an attendee identifier. The NFC tag 60 is already pre-written with the first portion of this identifier, a hardware encoded tag number from the manufacturer which cannot be altered. The server 11 generates and assigns the conference identifier and the attendee identifier. These two additional portions are encrypted with a conference-specific encryption key and written onto the NFC tag 60, so that the tag has a unique, encrypted attendee identifier. This encoding ensures that the attendee conference device 55 can only be used at the proper conference and cannot be used or read outside the conference. The attendee 15 uses the attendee conference device 55 to make automatic connections with exhibitors 16 at the conference, as will be described below.

The exhibitor 16 also receives specialized hardware at check-in. The exhibitor 16 receives exhibitor conference devices 56, which are preferably tablet devices having a display 61, a processor 62 coupled to non-transitory memory 63, a hard or soft keypad, and a short-range wireless transmission device preferably in the form of an NFC reader 64. The exhibitor 16 generally rents or leases the exhibitor conference devices 56 for only the duration of the conference, returning them at the conclusion of the conference for re-use. The exhibitor 16 may rent a large number of exhibitor conference devices 56 based on the number of representatives working the booth, but typically rents at least two exhibitor conference devices 56: one to function as an attendee-directed exhibitor conference device 56 and the other to function as an exhibitor-directed exhibitor conference device. Generally, the description herein will refer to the attendee-directed exhibitor conference device as the exhibitor conference device 56 unless otherwise noted, but it should be understood that the exhibitor- and attendee-directed exhibitor conference devices are identical but for an operational setting. The exhibitor conference device 56 is pre-encoded based on information provided by the exhibitor 16 during registration. The exhibitor conference device 56 preferably does not actually include the information provided by the exhibitor 16, but instead includes encoded lookup information, or a unique exhibitor identifier. Both the exhibitor- and attendee-directed exhibitor conference devices 56 are programmed with identical software for decrypting the NFC tag 60 and prompting an attendee 15 or an exhibitor 16 for input, as will be explained.

After receiving the exhibitor conference device 56, the exhibitor 16 sets up her booth. As part of setting up, the exhibitor 16 sets up the exhibitor conference device 56. The attendee-directed exhibitor conference device 56 has a display 61, and so she directs this display 61 outward so that it is visible by attendees 15 and passers-by. The NFC reader in the exhibitor conference device 56 is typically embedded within the device 56 but an electric extension runs from proximate to the NFC reader to just above the device 56, terminating in a large, marked tab which attendees 15 can easily find. She ensures that the tab and the extension are coupled and in good working order.

She will then set up the exhibitor-directed exhibitor conference device 56. Typically, the exhibitor-directed exhibitor conference device 56 will be positioned near the back of the booth; attendees do not interact with it unless they are invited to do so by the exhibitor 16. She will log in to the exhibitor-directed attendee conference device 56, thereby associating her name as an interviewer of attendees 15 who might stop by to talk or connect. If two people are working as representatives for the exhibitor 16 at the conference, each may have their own exhibitor conference device 56, and thus would be logged in as interviewers on their respective exhibitor-directed exhibitor conference devices 56. If, however, they are sharing the exhibitor-directed exhibitor conference device 56, then each would log in as an interviewer when using the exhibitor-directed exhibitor conference device 56 and working with an attendee 55.

When the conference begins, attendees 15 wander past exhibitor 16 booths, as is conventional at any conference. Each booth is equipped with an exhibitor conference device 16. The attendee 15, upon seeing a booth in which he might have an interest, approaches the booth. The attendee 15 may talk with the exhibitor 16 and learn more about the company, products, or services she offers. Or, the attendee 15 may simply wish to make a connection and move on to the next booth, able to review literature from the exhibitor 16 at a later time.

To access this literature, however, the attendee 15 must establish a connection. An automatic connection is made quickly and easily. The attendee 15 simply grasps his attendee conference device 55—his badge—and registers or brings it in close proximity to the tab on the exhibitor conference device 56. The attendee conference device 55 is brought to near-field proximity, within about 2 inches (about 5 centimeters), of the tab of the exhibitor conference device 56, so that the attendee conference device 55 is placed within the induced magnetic field of the exhibitor conference device 56. This creates a small current in the attendee conference device 55, powering the NFC tag 60 in it. The exhibitor conference device 56 is now able to read the NFC tag 60 in the attendee conference device 55 and the encoded lookup string embedded on the NFC tag 60.

Upon reading the NFC tag 60, the processor 62 of the exhibitor conference device 56 performs a quick decryption of the NFC tag 60 to verify that the NFC tag 60 is from the correct conference. If it is not from the correct conference, the exhibitor conference device 56 displays an error message. If the NFC tag 60 is indeed from the correct conference, the exhibitor conference device 16 displays a pop-up screen on its display 61 to continue the attendee interaction and gather information. The pop-up screen prompts the attendee 15 to rate their interest in the exhibitor 16. The pop-up screen shows preferably shows five stars, and the attendee 15 can rate the exhibitor 16 by selecting however many stars he believes is appropriate. If no stars are selected, the interest level is recorded simply as "no rating." The attendee 15 can later change the interest level on his attendee personal device 12. In the described version of the software, after rating the interest level, the exhibitor conference device 56 displays two options: "Add note" or "Done." If the attendee 15 selects "Done," the exhibitor conference device 56 25 returns to its default status waiting for another attendee 15. If, on the other hand, the attendee 15 selects "Add note," then a text box is shown, and the attendee 15 can either type a note into the text box, or can dictate a note which is automatically transcribed into the text box by a third-party software provider. When the note is entered, the attendee 15 selects a "Done" button, the exhibitor conference device 56 stores on its own memory 63 all of the information gathered during the interaction in an information packet 70. This information packet 70, shown in FIG. 6, includes the lookup or ID string 71 including the attendee identifier 72, the exhibitor identifier 73, the rating 74 given by the attendee 15, and the note 75 left by the attendee 15. One having ordinary skill in the art will readily appreciate that other questions, surveys, or forms may be displayed to the attendee 15 at this stage, so that the attendee 15 may input other information 78 than just a rating and a note. Such information would be stored on the attendee account 30 and exhibitor account 40 similarly to the rating and note.

Figure 4:
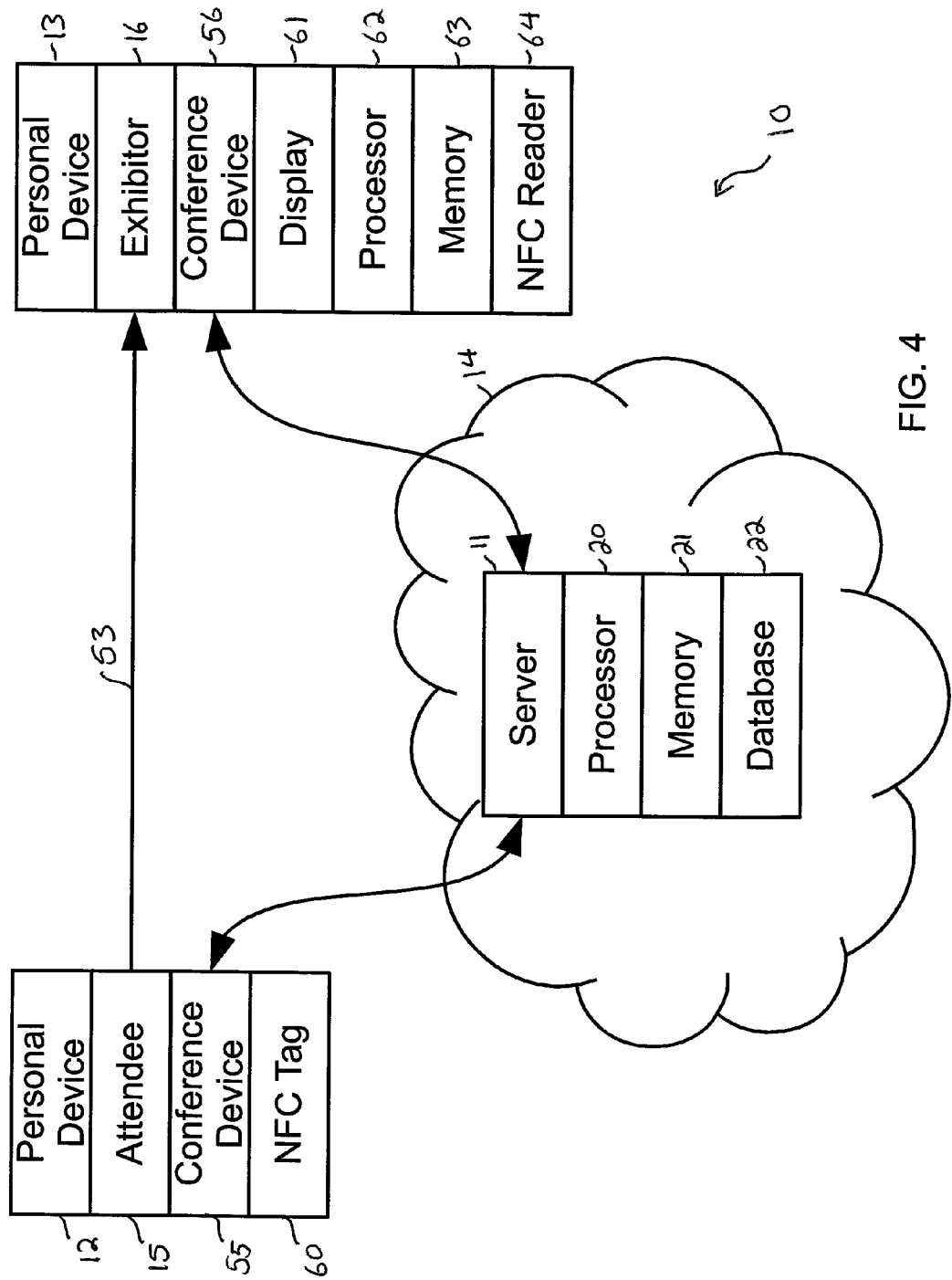
FIG. 4 is a generalized diagram of the system of FIG. 3 and illustrating an automatic connection established between the attendee and the exhibitor.

Upon reading and verifying the validity of the NFC tag 60, the exhibitor conference device 56 queries the server 11 and transmits the information packet 70. The exhibitor conference device 56 provides the server 11 with the lookup string 71 embedded in the NFC tag 60, as well as the information just gathered during the interaction with the attendee 15: the rating 74, note 75, and any other information 78. The processor 20 of the server 11 decodes the lookup string according to a decryption algorithm in the software on the memory 21. If the lookup string 72 points to an established attendee account 40, the server 11 checks if there is an existing connection between the referenced attendee 15 and exhibitor 16. If there is not a connection, the server 11 creates a connection. Preferably, all of the connections are stored in a connection table in the memory 21; the processor of the server 11 thus need only write to the connection table in the memory to create the connection. The connections 37 and 48 are portions of that connection table, but are shown schematically under the attendee and exhibitor accounts 30 and 40, respectively, for clarity. The exhibitor conference device 56 does not send just the lookup string, however, it also sends the information gathered during the interaction with the attendee 15: the rating, note, and any other information. All of this information is stored in the connections 37 and 48. An automatic connection 53 is thus established between the attendee 15 and the exhibitor 16, as shown in FIG. 4. The server 11 then sends a confirmation to the exhibitor conference device 16. On the other hand, if a connection had already been created, the server 11 processes and parses the data in the information packet to update the current ratings, notes, and other information.

If, for some reason, the Internet 14 is unavailable during the interaction, the exhibitor conference device 56 stores the information packet 70 locally in its memory 64 until a later time when the Internet 14 again becomes available. All of the exhibitor conference devices then begin transmitting their stored information packets 70 to the server 11 according to an algorithm defining the priority and order of the transmissions.

The attendee 15 can later delete the connection 53 or modify the connection 53 by removing or changing the star rating or notes regarding the exhibitor 16.

The exhibitor 16 is also provided with the opportunity to rate the estimated level of interest of the attendee 15 in the exhibitor 16. The exhibitor 16 may ask the attendee 15 to tap the exhibitor-directed exhibitor conference device 56 at the back of the booth. By doing so, the exhibitor-directed exhibitor conference device 56 displays pop-up screens that allow the exhibitor 16 to including a booth rating 76 her perceived interest from the attendee 15, add a booth note 77, or add other information. This information is associated with an information packet 70 after decrypting the NFC tag 60 on the attendee conference device 55. The "booth note" is a private note for the exhibitor 16 about the attendee 15, stored in the exhibitor account 40, and which the attendee 15 cannot view. One having ordinary skill in the art will readily appreciate that other questions, surveys, or forms may be displayed to the exhibitor 16 at this stage, so that the exhibitor 16 may input more information than just a rating and a note.

The above describes the process for creating an automatic connection 53 when the lookup string points to an established attendee account 40. However, if the lookup string points to an attendee account 40 that does not exist, the server instructs the exhibitor conference device to display a warning such as "The tag is empty or the wrong type of tag! Please go to the nearest help table to have it fixed." This instructs the attendee 15 to take the attendee conference device 55 to a help desk, where the attendee conference device 55 is checked to determine if it is a fraudulent attendee conference device 55, in which case it is confiscated, or if it is broken, in which case a new attendee conference device 55 is issued to the attendee 15.

As soon as the connection 53 is made, the attendee 15 and the exhibitor 16 can communicate with each other through the messaging 52 function. Additionally, the exhibitor can now view some of the information in the attendee account 30 for the attendee 15 with which she is connected. The attendee 15 can later delete the connection; the exhibitor 16 cannot.

After the conference, the exhibitor 16 often follows up by supplying new literature to the files 47 and by contacting the attendee 15. If the exhibitor 16 adds literature to the files 47 after an attendee 15 has visited the files 47, then the next time the attendee 15 logs in to his attendee account 30, he is notified of the update. A "New Files" label, or something similar, appears next to the name of the exhibitor 16, thus letting the attendee 15 know that there may be something new of interest. In an embodiment, a notification that new literature is available is pushed to the attendee 15 by the server 11 in response to the exhibitor account 40 being updated with new literature.

The database 22 provides a wealth of information to the exhibitor 16 about the attendees 15. Just as the attendee 15 can access the listings 50, so, too, can the exhibitor 16. However, when the exhibitor 16 accesses the listings 50, she only sees attendees 15 with whom she has a connection. The listings 50 displays information such as connection time, last name, attendee rating, booth rating, interview, follow-up, and last edit, and can be sorted or searched along each of these categories by the exhibitor 16. The listings 50 further displays information such as attendee email 33, phone 34, company information 35, interests 36, attendee rating, and attendee notes.

For all of the connected attendees 15, the exhibitor 16 can edit the interviewer, booth rating, booth notes, and follow-up fields. The exhibitor 16 cannot edit any fields provided by the attendee 15. The interview field, which is set based on the person at the exhibitor 16 booth when the attendee 15 made the automatic connection, can be altered later, or can be filled if the connection was a manual one made before or after the conference. The booth rating and booth notes allow the exhibitor 16 to add, modify, or delete an interest level and notes concerning communications with the attendee 15. The follow-up field identifies an employee, office, region, or other responsible party with exhibitor 16 should follow up with the attendee 15. This field is also used to document follow-up dates with the attendee 15. This field can be modified and added to based upon subsequent communications with the attendee 15. Follow-up is conducted through the messaging 52 function or by phone.

The system 10 provides the companies represented by the exhibitors 16 with immediate, real-time reporting, analysis, and up-dateability. For instance, an executive for a company who wishes to check in on the status of the conference, but who is not at the conference, can log in to the exhibitor account 40 and export a report. The listings 50 can be converted into a spreadsheet for analysis. The executive can determine, for example, how many attendees 15 connected before lunch, after lunch, at the beginning of the conference, in the last hours of the conference, during one representative's hours or another representative's hours. The executive can further review how interest levels fluctuate throughout the conference, as rated by the attendees 15 and the exhibitors 16. In this way, the executive can gauge which hours or employees are most productive. Additionally, if the exhibitor 16 finds that attendees 15 are continually requesting a certain type of literature that is not available, the exhibitor 16 can direct the home office to upload the literature to the exhibitor files 47, where it is instantly available to all attendees 15, connected or not.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:

1. A system for establishing a connection between an exhibitor and an attendee to an event before, during, and after the event, so as to enable the transferring of information between the exhibitor and the attendee, the system comprising:
   first and second NFC devices each having NFC tags comprising an on-board microchip coupled to an antenna, and each programmed with software for decrypting the NFC tags;
   a server including a processor, non-transitory memory, and a database, which server is programmed with software to communicate with each of the first and second NFC devices, is electronically and wirelessly coupled through a network to each of the first and second NFC devices, and is programmed to:
   maintain a first plurality of attendee accounts, one of the attendee accounts corresponding to the first NFC device and including multi-media digital content information;
   maintain a second plurality of exhibitor accounts, one of the exhibitor accounts corresponding to the second NFC device and including multi-media digital content information;
   in response to the first NFC device being registered in near-field proximity to the second NFC device, receive from the second NFC device an electronic instruction to connect the one of the attendee accounts and the one of the exhibitor accounts;
   in response to receiving the electronic instruction and the network being in an operating condition, establish a connection to connect the one of the attendee accounts and the one of the exhibitor accounts and, in response to receiving the electronic instruction and the network not being in an operating condition, then store the electronic instruction until such time as the network is operating and then establish the connection to connect the one of the attendee accounts and the one of the exhibitor accounts;
   upon establishment of a connection:
   allow the attendee to transfer information from the one of the exhibitor accounts;
   allow the exhibitor to update information on the one of the exhibitor accounts; and
   automatically notify the one of the attendee accounts in response to the one of the exhibitor accounts being updated with additional information without a need for physical proximity of the attendee and exhibitor;
   wherein upon establishment of a connection further comprises subsequent to the establishment of the connection, allow the exhibitor to add additional information to the one of the exhibitor accounts, automatically notify the one of the attendee accounts in response thereto, and then allow the attendee to transfer the additional information from the one of the exhibitor accounts; and
   terminate the connection and revoke access of the exhibitor to the one of the attendee accounts immediately in response to a request by the attendee and not in response to a request by the exhibitor.

2. The system of claim 1, further comprising a connection defined by the NFC tag of the first near-field communication device being registered in near-field proximity to the NFC tag of the second near-field communication device.

3. The system of claim 1, wherein the server is further programmed to push a notice to the one of the attendee accounts in response to the one of the exhibitor accounts being updated with additional information.

4. The system of claim 1, wherein the multi-media digital content information in the attendee accounts includes biographical content.

5. The system of claim 1, wherein the multi-media digital content information in the exhibitor accounts includes one of biographical content, written content, audio content, video content, and hyperlinks.

6. The system of claim 1, wherein:
the first NFC device is coded with a unique attendee identifier and an event identifier; and
the second NFC device is coded with a unique exhibitor identifier and the event identifier.

7. The system of claim 1, wherein near-field proximity is characterized as the first NFC device being brought within an induced magnetic field created by the second NFC device.

8. The system of claim 1, wherein in response to the first NFC device being registered in near-field proximity to the second device is further characterized as the first NFC device being brought within an induced magnetic field created by the second NFC device, the induced magnetic field inducing a current in the first NFC device powering the first NFC device, and the second NFC device reading the NFC tag of the first NFC device.

9. The system of claim 1, wherein upon establishment of a connection further comprises subsequent to the establishment of the connection, allow the exhibitor to change information on the one of the exhibitor accounts, automatically notify the one of the attendee accounts in response thereto, and then allow the attendee to transfer the information from the one of the exhibitor accounts.

10. A method for establishing a connection between an exhibitor and an attendee for an event before, during, and after the event, so as to enable the transferring of information between the exhibitor and the attendee, the method comprising:
providing an exhibitor and a first NFC device to the exhibitor, the first NFC device having an NFC tag comprising an on-board microchip coupled to an antenna and being programmed with software for decrypting the NFC tag;
providing an attendee and a second NFC device to the attendee, the second NFC device having an NFC tag comprising an on-board microchip coupled to an antenna and being programmed with software for decrypting the NFC tag;
providing a computer server including a processor, non-transitory memory, and a database, the computer server specially programmed with software to communicate with each of the first and second NFC devices;
coupling the first and second NFC devices to the computer server through a network through wireless communication;
the exhibitor creating an exhibitor account on the database and loading it with information about the exhibitor including multi-media digital content;
the attendee creating an attendee account on the database and loading it with information about the attendee including multi-media digital content;
bringing the first and second NFC devices in near-field proximity to each other;
in response to bringing the first and second NFC devices in near-field proximity and the network being in an operating condition, establishing a connection between the exhibitor and the attendee, and, in response to bringing the first and second NFC devices in near-field proximity and the network not being in an operating condition, waiting until the network is in an operating condition, and then establishing the connection, which connection immediately provides the exhibitor with access to information in the attendee account and contemporaneously provides the attendee with access to information in the exhibitor account;
upon establishing a connection:
allowing the attendee to transfer information from the one of the exhibitor accounts;
allowing the exhibitor to update information on the one of the exhibitor accounts; and
automatically notifying the one of the attendee accounts in response to the one of the exhibitor accounts being updated with additional information without a need for physical proximity of the attendee and exhibitor;
wherein the step of upon establishing a connection further comprises subsequent to the establishment of the connection, allowing the exhibitor to add additional information to the one of the exhibitor accounts, automatically notifying the one of the attendee accounts in response thereto, and then allowing the attendee to transfer the additional information from the one of the exhibitor accounts; and
terminating the connection and revoking access of the exhibitor to information in the attendee account immediately in response to a request by the attendee and not in response to a request by the exhibitor.

11. The method of claim 10, wherein the information in the attendee account includes biographical content.

12. The method of claim 10, wherein the information in the exhibitor account includes one of biographical content, written content, audio content, video content, and hyperlinks.

13. The method of claim 10, further providing the step of pushing a notice to the attendee account in response to the exhibitor account being updated with additional information.

14. The method of claim 10, wherein:
the first NFC device is coded with a unique exhibitor identifier and an event identifier; and
the second NFC device is coded with a unique attendee identifier and the event identifier.

15. The method of claim 10, wherein:
the first NFC device comprises a passive NFC device; and
the second NFC device comprises a near-field reader configured to read a NFC device.

16. The method of claim 10, wherein near-field proximity is characterized as the first NFC device being brought within an induced magnetic field created by the second NFC device.

17. The method of claim 10, wherein in response to the first and second NFC devices being brought in near-field proximity is further characterized as the first NFC device being brought within an induced magnetic field created by the second NFC device, the induced magnetic field inducing a current in the first NFC device powering the first NFC device, and the second NFC device reading the NFC tag of the first NFC device.

18. The method of claim 10, wherein the step of upon establishing a connection further comprises subsequent to the establishment of the connection, allowing the exhibitor to change information to the one of the exhibitor accounts, automatically notifying the one of the attendee accounts in response thereto, and then allowing the attendee to transfer the information from the one of the exhibitor accounts.

* * * * *